(12) United States Patent  (10) Patent No.: US 7,634,142 B1
Bourdev et al.  (45) Date of Patent: Dec. 15, 2009

(54) DETECTING OBJECTS IN IMAGES USING A SOFT CASCADE

(75) Inventors: Lubomir D. Bourdev, San Jose, CA (US); Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 788 days.

(21) Appl. No.: 11/042,942

(22) Filed: Jan. 24, 2005

(51) Int. Cl.
*G06K 9/62* (2006.01)
*G06K 9/00* (2006.01)

(52) U.S. Cl. .................. 382/224; 382/181; 382/228

(58) Field of Classification Search ................. 382/118, 382/224, 228, 181
See application file for complete search history.

(56) References Cited

U.S. PATENT DOCUMENTS

| | | |
|---|---|---|
| 4,975,969 A | 12/1990 | Tal |
| 5,164,992 A | 11/1992 | Turk et al. |
| 5,440,676 A | 8/1995 | Alappat et al. |
| 6,770,441 B2 | 8/2004 | Dickinson et al. |
| 6,858,394 B1 | 2/2005 | Chee et al. |
| 7,020,337 B2 | 3/2006 | Viola et al. |
| 7,024,033 B2 | 4/2006 | Li et al. |
| 7,033,754 B2 | 4/2006 | Chee et al. |
| 7,050,607 B2 | 5/2006 | Li et al. |
| 7,076,473 B2 | 7/2006 | Moghaddam |
| 7,194,114 B2 | 3/2007 | Schneiderman |
| 7,274,832 B2 | 9/2007 | Nicponski |
| 7,286,707 B2 | 10/2007 | Liu et al. |
| 7,421,114 B1 | 9/2008 | Brandt |
| 7,440,587 B1 | 10/2008 | Bourdev |
| 7,440,930 B1 | 10/2008 | Brandt |
| 2003/0110147 A1 | 6/2003 | Li et al. |
| 2004/0066966 A1 | 4/2004 | Schneiderman |
| 2004/0186816 A1 | 9/2004 | Lienhart et al. |
| 2005/0102246 A1 | 5/2005 | Movellan et al. |
| 2006/0062451 A1 | 3/2006 | Li et al. |
| 2006/0147107 A1 | 7/2006 | Zhang et al. |
| 2006/0222239 A1 | 10/2006 | Bargeron et al. |
| 2006/0248029 A1 | 11/2006 | Liu et al. |
| 2007/0101269 A1 | 5/2007 | Hua et al. |
| 2007/0110308 A1 | 5/2007 | Hwang et al. |
| 2008/0095445 A1 | 4/2008 | Brandt |

OTHER PUBLICATIONS

R. Xiao et al., "Boosting Chain Learning for Object Detection," IEEE Computer Society, Proceedings of the Ninth IEEE International Conference on Computer Vision, (ICCV 2003) 2- vol. Set 0-7695-1950-4/03, 7 pages.

(Continued)

*Primary Examiner*—John B Strege
(74) *Attorney, Agent, or Firm*—Fish & Richardson P.C.

(57) ABSTRACT

Systems, methods, and computer program products, implementing techniques for detecting objects using a soft cascade. The techniques include receiving a digital data segment and determining whether the digital data segment resembles an object of interest by passing the digital data segment through a cascade. The cascade includes an ordered sequence of stages and a rejection function after each stage that determines whether to reject the digital data segment at the current stage as not resembling the object of interest, or to allow the digital data segment to pass to the next stage of evaluation. The rejection function allows the digital data segment to fail the current stage and still pass to the next stage.

48 Claims, 3 Drawing Sheets

OTHER PUBLICATIONS

Jones, Michael et al., "Model-Based Matching by Linear Combinations of Prototypes," 1995, (pp. 1-9).

King, Andrew, "A Survey of Methods for Face Detection," Mar. 3, 2003, (pp. 1-32).

Viola, Paul et al., "Rapid Object Detection Using a Boosted Cascade of Simple Features" Conference on Computer Vision and Pattern Recognition 2001, (pp. 1-9).

Viola, Paul et al., "Robust Real-Time Object Detection," Second International Workshop on Statistical and Computational Theories of Vision—Modeling, Learning, Computing, and Sampling, Vancouver, Canada, Jul. 31, 2001 (pp. 1-20).

Wu, Jianxin et al., "Learning A Rare Event Detection Cascase by Direct Feature Selection," College of Computing and GVU Center, Georgia Institute of Technology, 2003, (pp. 1-8).

Yen-Yu Lin, et al., "Fast Object Detection with Occlusions," Institute of Information Science, Academia Sinica, Nankang, Taipei, Taiwan, 2004 (pp. 402-413).

Camus et al. "Reliable and Fast Eye Finding in Close-Up Images", IEEE, pp. 389-394, 2002.

Crow, "Summed Area Tables for Texture Mapping", SIGGRAPH, 1984.

Feraud et al., "A Fast and Accurate Face Detector Based on Neural Networks", IEEE Transactions on Pattern Analysis and Machine Intelligence, vol. 23, Jan. 2001.

Freund et al., "A Decision-Theoretic Generalization of On-Line Learning and an Application to Boosting", Journal of Computer and System Sciences 55:119-139, 1997.

Fukai et al., "Facial Feature Point Extraction Method Based on Combination of Shape Extraction and Pattern Matching", Jan. 1999.

Heisele et al., "Hierarchical Classification and Feature Reduction for Fast Face Detection with Support Vector Machines", Pattern Recognition, vol. 36, 2003.

Hwang, "Pupil Detection in Photo ID", Image Processing: Algorithms and Systems, III, Proc. of SPIE-IS&T Electronic Imaging, S298:82-87, 2004.

Kawaguchi et al., "Iris detection using intensity and edge information", Pattern Recognition 36:549-562, 2003.

Li et al., "FloatBoost Learning and Statistical Face Detection", IEEE Transactions on Pattern Analysis and Machine Intelligence, vol. 26, Sep. 2004.

Luo et al., "An Efficient Automatic Red-Eye Detection and Correction Algorithm", Proceedings of the 17th International Conference on Pattern Recognition (ICPR'04), 4 pages, 2004.

Meir et al., "An Introduction to Boosting and Leveraging", Department of Electrical Engineering, Research School of Information Sciences and Engineering, Technion, Haifa 3200, Israel. Downloaded from the Internet, URL: <http://www-ee.technion.ac.il/!~meir>, 66 pages, 2003.

Rizon et al., "Automatic Eye Detection Using Intensity and Edge Information", IEEE, pp. II415-II420, 2000.

Rosenfeld et al., "Coarse-to-Fine Template Marching", IEEE Trans. Syst. Man Cybernet, vol. 2, 1997.

Rowley et al., "Neural Network-Based Face Detection", IEEE Pattern Analysis and Machine Intelligence, vol. 20, 1998.

Sahbi et al., "Coarse-to-Fine Support Classifiers for Face Detection", ICPR, 2002.

Scassellati, "Eye Finding via Face Detection for a Foveated, Active Vision System", Proceedings of 15th National Conference of Artificial Intelligence, 1998.

Schapire et al., "Boosting the margin: a new explanation for the effectiveness of voting methods", Proc. 14th Intl. Conf. Machine Learning, pp. 322-330, 1997.

Schapire et al., "Improved Boosting Algorithms Using Confidence-Rated Predictions", Proceedings of the 11th Annual Conference of Computational Learning Theory, pp. 80-91, 1998.

Schapire, "The Boosting Approach to Machine Learning", Princeton University, downloaded from the Internet, URL: <www.cs.princeton.edu/~schapire>, 32 pages, 2002.

Schapire, "The Strength of Weak Learnability", Machine Learning 5:197-227, 1990.

Schneiderman et al., "Object Detection Using the Statistics of Parts", International Journal of Computer Vision, 2002.

Schneiderman, "A Statistical Approach to 3D Object Detection Applies to Faces and Cars", Ph.D. Thesis, CMI, May 2000.

Schneiderman, "Feature centric evaluation for efficient cascaded object detection", IEEE Conf. Computer Vision and Pattern Recognition, 2004.

Smolka et al., "Towards automatic redeye effect removal", Pattern Recognition Letters 24:1767-1785, 2003.

Sobottka et al., "A novel method for automatic face segmentation facial feature extraction and tracking", Signal Processing: Image Communication 12:263-281, 1998.

Sun et al., "Automatic cascade training with perturbation bias", IEEE Conf. Computer Vision and Pattern Recognition, 2004.

Sun et al., "Quantized Wavelet Features and Support Vector Machines for On-Road Vehicle Detection", Seventh International Conference on Control, Automation, Robotics and Vision, 2002.

Valiant, "A Theory of the Learnable", Comm. ACM 27(11):1134-1142, 1984.

Yang et al., "Detecting Faces in Images: A Survey", IEEE Transactions on Pattern Analysis and Machine Intelligence, vol. 24, No. 1, Jan. 2002, 25 pages.

Zhu et al., "A fast automatic extraction algorithm of elliptic object groups from remote sensing images", Pattern Recognition Letters 25:1471-1478, 2004.

FIG. 4B

DETECTING OBJECTS IN IMAGES USING A SOFT CASCADE

BACKGROUND

The present invention relates to detecting objects in images.

In this specification, the term image can refer to an entire image, or to a portion of an image.

A well-known technique for detecting objects in images is to use a cascade. The cascade includes an ordered sequence of stages. Each stage includes a detector function. Conventionally, the detector function is a binary classification function that outputs a positive result if an image resembles an object of interest and a negative result if an image does not resemble an object of interest.

After each stage is a rejection function that determines, based on the output of the current stage, whether to reject the image at the current stage as not resembling the object of interest, or to allow the image to pass to the next stage of evaluation by the cascade.

In a conventional cascade, if the image fails the current stage, that is, if the output of the current stage is negative, then the rejection function rejects the image as not resembling the object of interest. The image must receive a positive result from all of the stages of the cascade in order to be classified by the cascade as resembling the object of interest. Thus, a candidate image with otherwise salient, object-like features may be incorrectly rejected by the cascade just because the image barely fails to satisfy the criteria of a single stage. Conversely, a non-object image that just barely passes the criteria of all the stages may be incorrectly accepted by the cascade. In this specification, such a prior art cascade will be referred to as a hard cascade.

One known type of hard cascade, commonly referred to as a boosting chain, propagates the detector output of a current stage to subsequent stages so that the detector functions in subsequent stages can make use of the prior detector output. However, because the detector function of each stage of a hard cascade relies on the detector output produced in a prior stage, the stages within a boosting chain cannot be reordered. Boosting chains are further described in the paper, "Boosting Chain Learning for Object Detection", by Rong Xiao, Long Zhu, and Hong-Jiang Zhang, published at the IEEE Society's International Conference on Computer Vision (2003).

SUMMARY

In one general aspect, the invention provides systems, methods, and computer program products, implementing techniques for detecting objects using a soft cascade. The techniques include receiving a digital data segment and determining whether the digital data segment resembles an object of interest by passing the digital data segment through a cascade. The cascade includes an ordered sequence of stages and a rejection function after each stage that determines whether to reject the digital data segment at the current stage as not resembling the object of interest, or to allow the digital data segment to pass to the next stage of evaluation. The rejection function allows the digital data segment to fail the current stage and still pass to the next stage.

Implementations can include one or more of the following features.

The rejection function makes the determination based on stage output from the current stage and from one or more prior stages.

The rejection function computes a sum of the stage outputs and compares the sum against a threshold value.

Each stage outputs a scalar value.

The scalar value is proportional to how important the stage is and how well or poorly the digital data segment passed or failed the stage.

The techniques further include receiving user input specifying a target accuracy or speed and calibrating the cascade to operate at the target accuracy or speed.

The target accuracy is specified as a false positive rate, a detection rate, or both.

Calibrating the cascade includes determining an ordering for the stages of the cascade, and determining a rejection threshold to be used by the rejection function after each stage of the cascade.

The stages are ordered based on speed.

The stages are ordered based detection rate.

The rejection threshold is selected to match a target detection rate or false positive rate.

Calibrating the cascade is an iterative process that includes a first iteration where all stages of the cascade are tested against a calibration set of positive digital data segments and negative digital data segments, and one of the stages is selected to be the first stage of the cascade, and one or more subsequent iterations where the remaining, unselected stages of the cascade are tested against the calibration set and another one of the stages is selected to be the next stage of the cascade. The positive digital data segments are digital data segments corresponding to the object of interest, the negative digital data segments are digital data segments not corresponding to the object of interest.

The calibration process further includes during each iteration of the calibration process, adding additional negative digital data segments to the calibration set.

The calibration process further includes prior to the first iteration of the calibration, compiling a set of additional negative digital data segments, adding the set of additional negative digital data segments to the calibration set to form an extended calibration set, and using the extended calibration set for all iterations of the calibration.

The calibration process further includes assigning a weight to each of the additional negative digital data segments.

The digital data segment is an image.

In another general aspect, the invention provides systems, methods, and computer program products, implementing techniques for training a cascade. The techniques include receiving a training set that includes a plurality of positive digital data segments and a plurality of negative digital data segments and using a boosting process to train a cascade to discriminate between the positive and negative digital data segments in the training set. The boosting process is an iterative process that includes adding one or more new digital data segments to the training set during each iteration of the process. The positive digital data segments are digital data segments that correspond to an object of interest. The negative digital data segments are digital data segments that do not correspond to the object of interest.

Implementations can include one or more of the following features.

The one or more new digital data segments are all negative digital data segments.

The digital data segments in the training set and the new digital data segments added to the training set each have an assigned weight. The boosting process further includes, once the new digital data segments are added to the training set, scaling back the weights of digital data segments in the training set.

The cascade includes a sequence of stages. Each iteration of the boosting process further includes training one of the stages of the cascade and removing one or more of the stages trained in previous iterations of the boosting process from the cascade.

The techniques further include, once the cascade is trained, calibrating the cascade to operate at a target accuracy or speed.

Varying the target accuracy or speed of the cascade by re-calibrating the cascade.

The digital data segments are images.

The invention can be implemented to realize one or more of the following advantages.

A cascade implemented using techniques of the invention is more accurate than the conventional hard cascade because it is less likely to incorrectly reject an image just because the image barely fails to satisfy the criteria of a single stage. It is also less likely to incorrectly accept a non-object image that just barely passes the criteria of all the stages.

A cascade implemented using techniques of the invention propagates the detector output of a current stage to subsequent stages so that subsequent rejection functions can make use of the prior detector output.

A cascade implemented using techniques of the invention requires fewer stages than a conventional cascade to perform at a given level of accuracy. This makes the cascade faster to use and to train than a conventional cascade.

The stages of a cascade implemented using techniques of the invention can be reordered during a calibration process. Each stage performs at a specific accuracy and speed. The calibration process can take into account the disparate accuracies and speeds of each of the individual stages of the cascade and reorder the stages of the cascade to vary the accuracy or speed of the overall cascade. The reordering can be performed without retraining the cascade. Thus, the accuracy or speed of the cascade can be varied without retraining the cascade.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In one general aspect, the invention provides systems, methods, and computer program products, implementing techniques for detecting objects using a soft cascade. A soft cascade differs from the conventional hard cascade in that an image can fail one or more stages of the soft cascade and still be classified by the soft cascade as resembling an object of interest.

Figure 1:
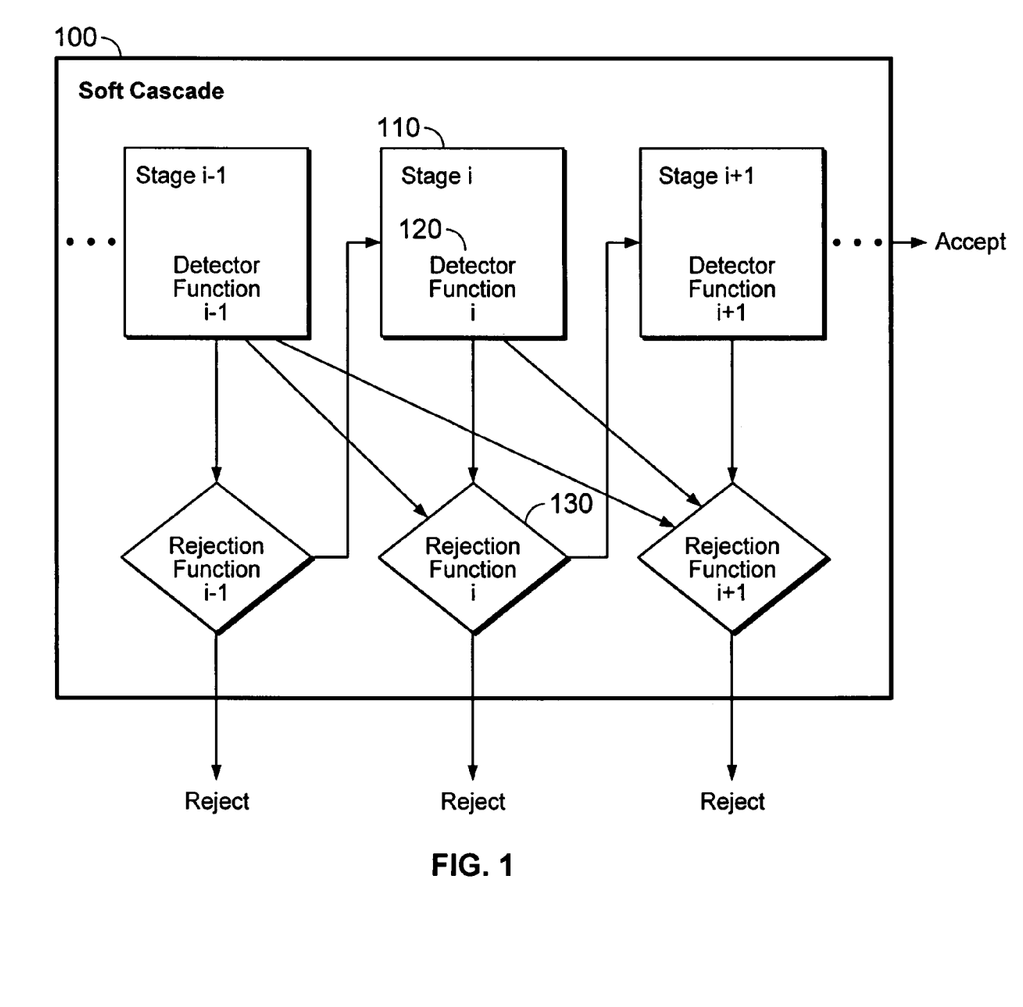
FIG. 1 illustrates a soft cascade in accordance with the invention.

As illustrated in FIG. 1, a soft cascade 100 includes an ordered sequence of stages 110. Each stage includes a detector function 120 that is trained to recognize a particular feature of the object of interest. Each stage is trained to recognize a different feature or set of features of the object of interest.

The detector function 120 outputs a confidence value that represents how closely the image resembles the particular feature of the object of interest. A closer resemblance results in a higher confidence value. An image passes the stage if the confidence value returned by the detector function is above a certain predetermined threshold value. Otherwise, the image fails the stage.

The output of the stage is a scalar value that is proportional to the confidence value returned by the detector function and the importance of the particular feature detected during the stage.

A rejection function 130 after each stage 110 uses the detector output from the current stage 110 and from the prior stages to determine whether to reject the image at the current stage as not resembling the object of interest, or to allow the image to pass to the next stage of evaluation by the cascade.

In one implementation, the rejection function 130 computes the thresholded sum of the detector outputs, as illustrated by the following pseudo-code:

```
bool sampleIsFace(x)
    d ← 0
    for t ← 1, . . . , T:
        d ← d + ct(x)
        if d < rt
            return false
    return true
```

Alternatively, another function besides the thresholded sum can be used to combine the stage outputs. Examples of other functions are multiplier functions, mean functions, and median functions.

Because: (1) the rejection function 130 in a soft cascade 100 considers not only the output of the current stage but also the output from prior stages; (2) the output of the stage reflects not just whether the image passed, but also by how much; and (3) because the output of the stage also reflects the importance of the stage, it is possible for an image to perform poorly in a given stage of the cascade, but still perform well for the overall cascade. This result could occur, for example, if the given stage is not very important, or if the candidate image performed very well in other stages of the cascade.

Figure 2:
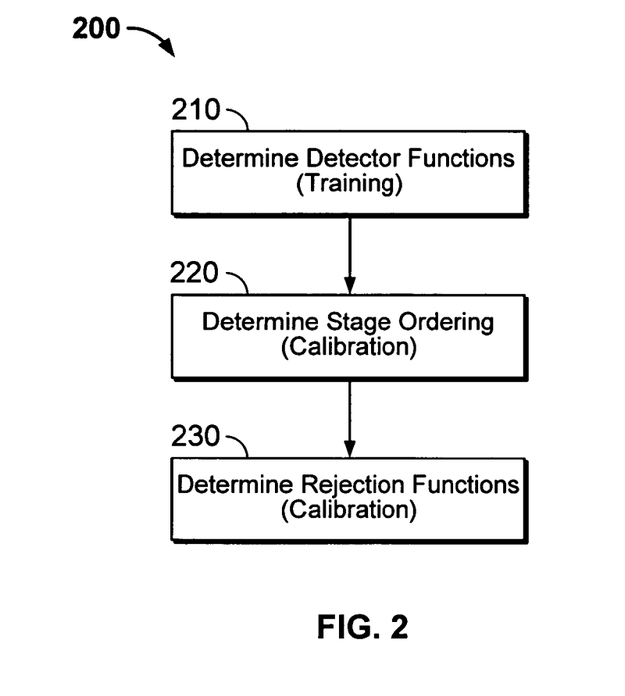
FIG. 2 illustrates a process for constructing a soft cascade.

As shown in FIG. 2, a process 200 for constructing a soft cascade includes determining a detector function for use in each stage of the soft cascade (step 210), determining an ordering for the stages of the soft cascade (step 220) and determining a rejection function for use after each stage of the soft cascade (step 230).

In this specification, the step of determining the detector functions for the soft cascade (step 210) will be referred to as training the soft cascade. The steps of determining the stage ordering and the rejection functions for the soft cascade (steps 220 and 230) will collectively be referred to as calibrating the soft cascade. The calibration steps can be performed in any order or simultaneously.

The soft cascade can be trained using any conventional technique for training a cascade. For example, those techniques used in the prior art for training hard cascades. Examples of such techniques are neural networks, support vector machines (SVMs) and boosting.

The following table illustrates one technique for training the soft cascade. In this table, the term sample is used to refer to a portion of an image.

Input:

a, b is the number of negative and positive samples, respectively.
Training samples $(x_1,y_1), \ldots, (x_{a+b}, y_{a+b})$ where $y_i = 0, 1$ for negative and positive samples, respectively,
T is the target number of weak classifiers Initialize $w_{o,i} = \frac{1}{2a}, \frac{1}{2b}$ for $y_i = 0, 1$, respectively For t = t, ..., T:
   1. For each feature j in a random subset of the features train a classifier $h_j$ restricted to using the feature. The error of the classifier is defined as $$\varepsilon_j = \sum_i w_i \, |h_j(x_i) - y_i|$$

2. Choose the classifier $h_r$ with the minimum error $\epsilon_r$.

Set $\beta_i = \frac{\varepsilon_i}{1 - \varepsilon_i}$, $\alpha_i = \log \frac{1}{\beta_i}$ and $c_i = \alpha_i h_i$    3. Add K bootstrapped negative, samples and scale back the weights of the existing negative samples to keep their sum constant:

3.1. $\forall\, i,\, y_i = 0\!: w_{t-l,i} \leftarrow w_{t-l,i} \frac{a}{a+K}$     3.2. For k = 1, ..., K add samples $(x_{N+k}, 0)$ with $$w_{r,N+k} = \frac{1}{2a} \text{ such that} \sum_{j=1}^{r} c_j(x_{N+k}) \geq \frac{1}{2}\sum_{j=1}^{r} \alpha_j$$

3.3. a ← a = K
   4. Optionally remove weak features
   5. Decrease the weights of all samples correctly classified by $h_j$ as in [10]:
    $\forall i, h_j(x_i) = y_i\!: w_{t-l,i} \leftarrow w_{t-l,i} \beta_t$
   6. Normalize the weights:

$$w_{i,i} = \frac{w_{r\_1,i}}{\sum_j w_{r\_1,i}}$$

Output:

The stage output functions $c_i$

The technique illustrated in the table above is a modification of a training technique known as "Adaboost".

The Adaboost technique was developed by Yoav Freund and Robert Shapire. This technique is described in the paper, "Robust Real-Time Object Detection", by Paul Viola and Michael J. Jones International Conference on Computer Vision, presented at IEEE Computer Society's 2001 International Conference on Computer Vision. The contents of this paper is hereby incorporated by reference.

The Adaboost technique is a specific form of a more general training technique known as "supervised learning." Supervised learning involves first obtaining a set of positive images that correspond to an object of interest and a set of negative images that do not correspond to the object of interest, and then training a cascade to distinguish between the two set of images. In this specification, these two sets of images will be collectively referred to as the training set.

The Adaboost training process is an iterative process. During each iteration of Adaboost, one stage of the cascade is trained using a weighted version of the training set. At the end of each iteration, the training set is reweighted so that those images that were misclassified during the current iteration are boosted in importance. The effect of this boosting is to focus the subsequent training on the more difficult-to-classify cases.

In the conventional Adaboost technique, the contents of the training set remain the same for all iterations of the training. In the modified Adaboost technique illustrated in Table 1 above, the contents of the training set change with each iteration. More specifically, new images are added to the training set after each iteration.

The new images can be positive images, negative images or a combination of positive and negative images. In the illustration above, only negative images are added because in general, the space of negative images is much larger than the space of positive images. Once the new images have been added to the training set, the weights of the existing images in the training set are scaled so that the overall weight total is kept constant.

In the conventional Adaboost technique, during each iteration of the training, a detector function is selected for inclusion in the so-far-trained cascade. This also occurs in the modified Adaboost technique. However, in the modified Adaboost technique, previously selected detector functions can also be removed from the so-far-trained cascade.

The reason for this removal is that, in light of the changes made to the training set, the detector functions chosen in previous iterations of the training may no longer be the best choices. For example, one or more of the previously chosen detector functions may be very poor at classifying the images newly added to the training set. Thus, an optional step in the modified Adaboost technique is to weed out the weak performing detector functions from the so-far-trained cascade.

The weak performing detector functions can be identified by running the so-far-trained cascade multiple times against the training set. Each time, a different detector function is removed from the so-far-trained cascade. The detector functions whose removal from the so-far-trained cascade results in an improved accuracy rate for the overall cascade are identified as being the weak performing detector functions. One or more of these weak performing detector functions can be removed from the so-far-trained cascade.

Once the soft cascade is trained, the soft cascade can then be calibrated. The following table illustrates one technique for calibrating the soft cascade. In this table, the term sample is used to refer to a portion of an image.

Input:

Calibration samples $X = \{(x_1,y_1), \ldots, (x_N, y_N)\}$ where $y_i = 0,1$ for negative and positive samples, respectively
$v_{t, \ldots, T}$ is the rejection distribution vector
$\{C\}$ is the set of T stage output functions $c_t$ determined by the training algorithm (Table. 1)

Initialize:

The sample responses $d_{0,i} = 0$
The fraction of faces we are allowed to reject p = 0
The expected execution time m = 0
The number of negative samples used so far $A = \Sigma y_i$
For t = t, ..., T:
   1. $p \leftarrow p + v_t$
   2. From the stages in $\{C\}$ select the index of the stage that maximizes separation between the positive and negative samples:

$$q(t) = \operatorname{argmax}_j \left( \frac{\sum_i ((d_{r,t-1} + c_j) y_i)}{\sum_i y_i} - \frac{\sum_i ((d_{r,t-1} + c_j)(1 - y_i))}{\sum_i (1 - y_i)} \right)$$

3. Update the sample traces:

-continued $$d_{t,i} \leftarrow d_{t-1,i} + c_{q(t)}(x_i)$$

4. Select the rejection threshold as the maximum one that removes no more than p fraction of the faces:

$$r_t = \text{argmax}_r \left( \sum_i (\text{pred}(d_{r,i} \leq r_r) y_i) \leq p \sum_i y_i \right)$$

5. Update:

$$p \leftarrow p - \sum_i (\text{pred}(d_{r,i} \leq r_r) y_i / \sum_i y_i$$

$$X \leftarrow X - \{(x_i y_i) \text{ for which } d_{r,i} < r_r\}$$

$$C \leftarrow C - \{c_{q(r)}\}$$

$$m \leftarrow m + \text{cost}(c_{q(r)}) \sum_i (1 - y_i)$$

6. Search $A_r$ number of randomly drawn negative samples until finding K bootstrapped ones:

6.1. For k = 1, ..., K add samples $(x_{N = K}, 0)$ with response $d_{r,N+k} = \sum_{j=1}^{r} c_{\phi(j)}(x_{N+k})$ such that: $\forall j = 1, ..., R \sum_{m=1}^{j} c_{q(m)}(x_{N+K}) \geq r_j$ 6.2. $N \leftarrow N + K$ 6.3. $A \leftarrow A + A_1$ Output:

The t-th stage output function $c_{q(t)}$ and rejection threshold $r_i$.
The expected false positive rate $\bar{F} = \Sigma(1 - y_i)/A$
The expected execution time $M = m/A$ Given a target accuracy or speed, the calibration technique illustrated in the table above determines an ordering for the stages and a rejection function for each stage of the soft cascade. The calibration samples used for the calibration can be a different set of positive and negative images than those that form the training set used for training.

The calibration technique involves testing all the stages of the cascade against a set of positive and negative images. This set will be referred to as the calibration set. Preferably, the calibration set is a different set of images from the training set.

One of the tested stages is then selected to be the first stage of the cascade. The selection can be based on one or more predetermined selection rules. Examples of selection rules are:

1. Select the stage that best separates the positive images in the calibration set from the negative images.
2. Select the stage that rejects the maximum number of negative images while rejecting no more than a predetermined number of positive images.
3. Select the fastest stage.
4. Select the stage that achieves the greatest positive and negative separation for a given evaluation speed or cost.
5. Assign higher weights to stages that better separate the positive images from the negative images. Also assign higher weights to stages that are faster. Select the stage with the highest weight.

The subsequent stages of the cascade are picked in a similar fashion, except that once a stage is picked, it is removed from the pool of stages that are tested. In the first iteration of the calibration technique, all N stages are tested. In the second iteration, only N−1 stages are tested, and so on. Also, for subsequent iterations of the calibration, new negative images are added to the calibration set.

Once the ordering for the stages is determined, the rejection threshold for each stage can be determined. As described above, these steps can also be reversed or performed simultaneously.

Figure 3:
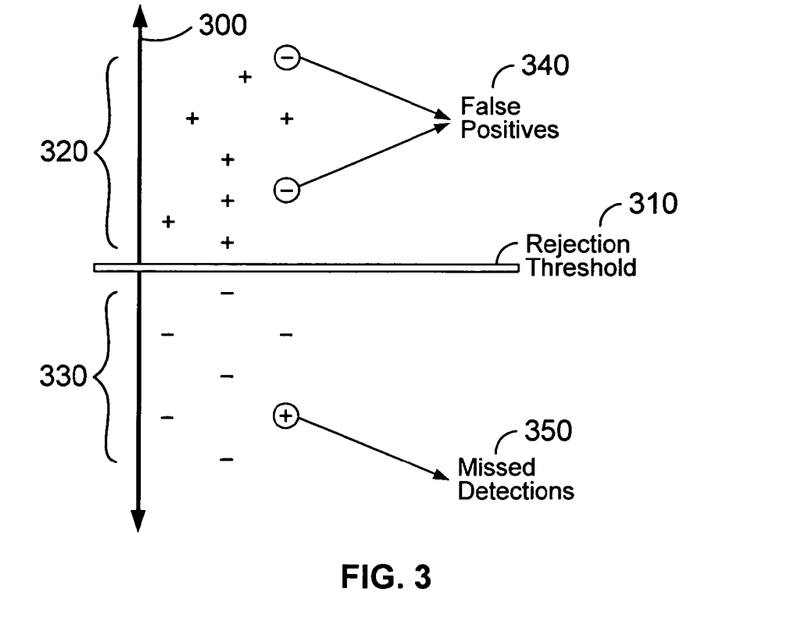
FIG. 3 illustrates a rejection threshold.

The rejection threshold is determined by evaluating the images in the calibration set against all stages chosen so far, and then ordering the images according to the sum of the evaluation results from each stage. FIG. 3 illustrates images ordered along a vertical axis 300. Images with a higher evaluation result are positioned higher along the vertical axis 300.

FIG. 3 also illustrates a rejection threshold 310 set at a given position along the vertical axis 300. Images that are above 320 the rejection threshold 310 will be allowed to pass to the next stage of evaluation by the cascade. Images that are below 330 the rejection threshold 310 will be rejected by the cascade as not resembling the object of interest. The images 320 that pass can include one or more false positives 340. These are images that do not correspond to the object of interest, but are incorrectly classified as corresponding. The images 330 that are rejected can include one or more missed detections 350. There are images that do correspond to the object of interest, but are incorrectly rejected by the cascade as not resembling the object of interest.

The rejection threshold 310 can be set to match a target detection rate or false positive rate. In one implementation, the calibration method receives input specifying the target detection rate or false positive rate. A higher rejection threshold results in a lower false positive rate, but also a lower detection rate. Conversely, a lower rejection threshold results in a higher detection rate, but also higher false positive rate.

Figure 4A:
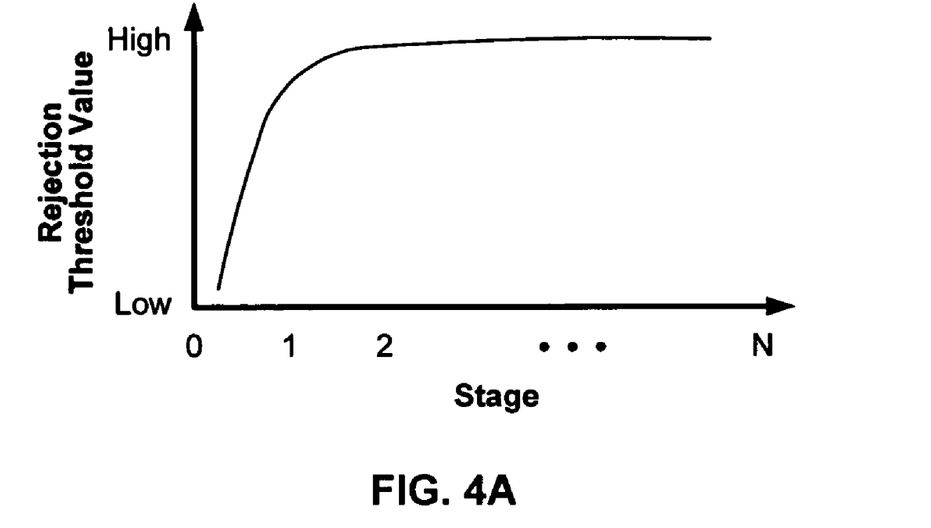
FIGS. 4A and 4B illustrate two contrasting calibrations.

As shown in FIG. 4A, if the initial stages of the cascade have a high rejection threshold, then the overall speed of the cascade is increased because many of the images are rejected early on, thereby leaving fewer images to be considered by the later stages of the cascade. However, this increase in speed comes at the price of reduced accuracy because the initial stages of the cascade produce a large number of missed detections.

Figure 4B:
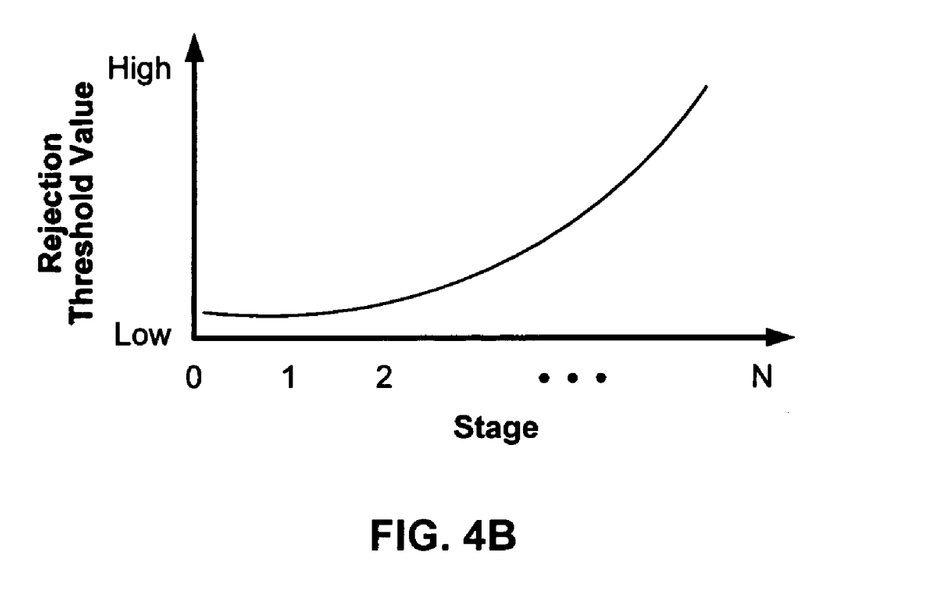

Conversely, as shown in FIG. 4B, if the initial stages of the cascade have a lower rejection threshold, then the overall speed of the cascade is slower because fewer of the images are rejected early on, thereby leaving more images to be considered by later stages of the cascade. Such a cascade, while slower, is more accurate.

The above-described calibration technique makes it easy to generate a family of cascades where each cascade in the family performs at a different accuracy or speed. Conventionally, to generate such a family requires training each cascade individually using different parameters for accuracy or speed. In an approach in accordance with the invention, a soft cascade can be trained just once, and then calibrated multiple times, each time to a different target accuracy or speed. Because calibration requires much less computation time than training, this approach is much faster than the conventional approach.

Other techniques besides the above-described calibration technique can be used to calibrate the cascade. For example, one alternative technique, which will be described below, involves compiling a representative set of negative images and using this representative set for each iteration of the calibration instead of the bootstrapping step in the above-described calibration technique.

The representative set of negative images is compiled by collecting sample images from a large number (in the order of a hundred million) of negative images, evaluating the sample images against the trained cascade and then ordering the sample images into bins based on the classifier response.

Each bin contains images that scored within a certain range (e.g., 0 to 0.1, 0.1 to 0.2, and so on). The number of bins used is arbitrary. The majority of each bin is then discarded.

The remaining images are assigned a weight that reflects the original size of each bin. For example, suppose that for every bin, 100 images are retained and the rest are discarded. If the original size of the bin is 1000, then each retained image in that bin will each have a weight of ten (1000/100). If the original size of the bin is 103, then each retained image will have a weight of slightly more than one (103/100). The weight of each image reflects how many images are approximated by that image. For example, an image with a weight of ten is a more compact way of representing ten identical images each with a weight of one. Using weights allows for a large distribution of images to be approximated using a small number of actual images.

The weighted images form the representative set of negative images. This set is compiled once, and then reused for each iteration of the calibration. The alternative calibration technique can result in faster calibration than the above-described calibration technique because the alternative technique does not need to obtain new negative images to add during each iteration of the calibration process.

A soft cascade trained and calibrated using the above-described techniques can be incorporated into a variety of different software applications, including but not limited to, image processing applications, for example, Adobe Photoshop®, available from Adobe Systems of San Jose, Calif. In one implementation, the software application can allow a user to specify a target accuracy or speed and the software application can then recalibrate the soft cascade according to the user-specified parameters.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, for example, a graphics processing unit (GPU), and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a digital camera, a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims. For example, although the invention has been described in terms of its application to image data, the invention can be applied to any other digital data, for example, audio data or textual data.

What is claimed is:

1. A computer program product, tangibly stored on a computer-readable medium, the computer program product comprising instructions operable to cause a programmable processor to perform operations comprising:
   receiving a digital data segment; and
   determining whether the digital data segment resembles an object of interest by passing the digital data segment through a cascade, the cascade including an ordered sequence of stages and a rejection function after each stage that determines whether to reject the digital data segment at a current stage as not resembling the object of interest, or to allow the digital data segment to pass to the next stage of evaluation, wherein the rejection function uses output from the current stage to determine whether to reject the digital data segment, wherein the output from the current stage is based upon an amount by which the digital data segment passed or failed the current stage, and wherein the rejection function allows the digital data segment to fail the current stage and still pass to the next stage.

2. The computer program product of claim 1, wherein:
   the rejection function further uses output from one or more prior stages to determine whether to reject the digital data segment.

3. The computer program product of claim 2, wherein:
   the rejection function computes a sum of the outputs from the current stage and the one or more prior stages and compares the sum against a threshold value.

4. The computer program product of claim 1, wherein:
   each stage outputs a scalar value.

5. The computer program product of claim 4, wherein:
   the scalar value is proportional to how important the stage is and an amount by which the digital data segment passed or failed the stage.

6. The computer program product of claim 1, further comprising:
   receiving user input specifying a target accuracy or speed; and
   calibrating the cascade to operate at the target accuracy or speed.

7. The computer program product of claim 6, wherein:
   the target accuracy is specified as a false positive rate, a detection rate, or both.

8. The computer program product of claim 6, wherein:
   calibrating the cascade includes determining an ordering for the stages of the cascade, and determining a rejection threshold to be used by the rejection function after each stage of the cascade.

9. The computer program product of claim 8, wherein the stages are ordered based on speed.

10. The computer program product of claim 8, wherein the stages are ordered based on detection rate.

11. The computer program product of claim 8, wherein the rejection threshold is selected to match a target detection rate or false positive rate.

12. The computer program product of claim 6, wherein calibrating the cascade is an iterative process that includes:
   a first iteration where all stages of the cascade are tested against a calibration set of positive digital data segments and negative digital data segments, the positive digital data segments being digital data segments corresponding to the object of interest, the negative digital data segments being digital data segments not corresponding to the object of interest, and one of the stages is selected to be the first stage of the cascade; and
   one or more subsequent iterations where the remaining, unselected stages of the cascade are tested against the calibration set and another one of the stages is selected to be the next stage of the cascade.

13. The computer program product of claim 12, wherein the calibration process further includes:
   during each iteration of the calibration process, adding additional negative digital data segments to the calibration set.

14. The computer program product of claim 12, wherein the calibration process further includes:
   prior to the first iteration of the calibration, compiling a set of additional negative digital data segments, adding the set of additional negative digital data segments to the calibration set to form an extended calibration set, and using the extended calibration set for all iterations of the calibration.

15. The computer program product of claim 14, wherein the calibration process further includes:
   assigning a weight to each of the additional negative digital data segments.

16. The computer program product of claim 1, wherein the digital data segment is an image.

17. A computer-implemented method comprising:
   receiving a digital data segment;
   determining whether the digital data segment resembles an object of interest by passing the digital data segment through a cascade, the cascade including an ordered sequence of stages and a rejection function after each stage that determines whether to reject the digital data segment at a current stage as not resembling the object of interest, or to allow the digital data segment to pass to the next stage of evaluation, wherein the rejection function uses output from the current stage to determine whether to reject the digital data segment, wherein the output from the current stage is based upon an amount by which the digital data segment passed or failed the current stage, and wherein the rejection function allows the digital data segment to fail the current stage and still pass to the next stage; and
   wherein the determining is performed by one or more processors.

18. The computer-implemented method of claim 17, wherein:
   the rejection function further uses output from one or more prior stages to determine whether to reject the digital data segment.

19. The computer-implemented method of claim 18, wherein:
   the rejection function computes a sum of the outputs from the current stage and the one or more prior stages and compares the sum against a threshold value.

20. The computer-implemented method of claim 17, wherein:
   each stage outputs a scalar value.

21. The computer-implemented method of claim 20, wherein:
   the scalar value is proportional to how important the stage is and an amount by which the digital data segment passed or failed the stage.

22. The computer-implemented method of claim 17, further comprising:
   receiving user input specifying a target accuracy or speed; and
   calibrating the cascade to operate at the target accuracy or speed.

23. The computer-implemented method of claim 22, wherein:
the target accuracy is specified as a false positive rate, a detection rate, or both.

24. The computer-implemented method of claim 22, wherein:
calibrating the cascade includes determining an ordering for the stages of the cascade, and determining a rejection threshold to be used by the rejection function after each stage of the cascade.

25. The computer-implemented method of claim 24, wherein the stages are ordered based on speed.

26. The computer-implemented method of claim 24, wherein the stages are ordered based on detection rate.

27. The computer-implemented method of claim 24, wherein the rejection threshold is selected to match a target detection rate or false positive rate.

28. The computer-implemented method of claim 22, wherein calibrating the cascade is an iterative process that includes:
a first iteration where all stages of the cascade are tested against a calibration set of positive digital data segments and negative digital data segments, the positive digital data segments being digital data segments corresponding to the object of interest, the negative digital data segments being digital data segments not corresponding to the object of interest, and one of the stages is selected to be the first stage of the cascade; and
one or more subsequent iterations where the remaining, unselected stages of the cascade are tested against the calibration set and another one of the stages is selected to be the next stage of the cascade.

29. The computer-implemented method of claim 28, wherein the calibration process further includes:
during each iteration of the calibration process, adding additional negative digital data segments to the calibration set.

30. The computer-implemented method of claim 28, wherein the calibration process further includes:
prior to the first iteration of the calibration, compiling a set of additional negative digital data segments, adding the set of additional negative digital data segments to the calibration set to form an extended calibration set, and using the extended calibration set for all iterations of the calibration.

31. The computer-implemented method of claim 30, wherein the calibration process further includes:
assigning a weight to each of the additional negative digital data segments.

32. The computer-implemented method of claim 17, wherein the digital data segment is an image.

33. A system comprising:
one or more processors; and
a machine-readable storage device, comprising instructions operable to cause the one or more processors to perform the following operations:
receiving a digital data segment; and
determining whether the digital data segment resembles an object of interest by passing the digital data segment through a cascade, the cascade including an ordered sequence of stages and a rejection function after each stage that determines whether to reject the digital data segment at a current stage as not resembling the object of interest, or to allow the digital data segment to pass to the next stage of evaluation, wherein the rejection function uses output from the current stage to determine whether to reject the digital data segment, wherein the output from the current stage is based upon an amount by which the digital data segment passed or failed the current stage, and wherein the rejection function allows the digital data segment to fail the current stage and still pass to the next stage.

34. The system of claim 33, wherein:
the rejection function further uses output from one or more prior stages to determine whether to reject the digital data segment.

35. The system of claim 34, wherein:
the rejection function computes a sum of the outputs from the current stage and the one or more prior stages and compares the sum against a threshold value.

36. The system of claim 33, wherein:
each stage outputs a scalar value.

37. The system of claim 36, wherein:
the scalar value is proportional to how important the stage is and an amount by which the digital data segment passed or failed the stage.

38. The system of claim 33, further operable to perform operations comprising:
receiving user input specifying a target accuracy or speed; and
calibrating the cascade to operate at the target accuracy or speed.

39. The system of claim 38, wherein:
the target accuracy is specified as a false positive rate, a detection rate, or both.

40. The system of claim 38, wherein:
calibrating the cascade includes determining an ordering for the stages of the cascade, and determining a rejection threshold to be used by the rejection function after each stage of the cascade.

41. The system of claim 40, wherein the stages are ordered based on speed.

42. The system of claim 40, wherein the stages are ordered based on detection rate.

43. The system of claim 40, wherein the rejection threshold is selected to match a target detection rate or false positive rate.

44. The system of claim 38, wherein calibrating the cascade is an iterative process that includes:
a first iteration where all stages of the cascade are tested against a calibration set of positive digital data segments and negative digital data segments, the positive digital data segments being digital data segments corresponding to the object of interest, the negative digital data segments being digital data segments not corresponding to the object of interest, and one of the stages is selected to be the first stage of the cascade; and
one or more subsequent iterations where the remaining, unselected stages of the cascade are tested against the calibration set and another one of the stages is selected to be the next stage of the cascade.

45. The system of claim 44, wherein the calibration process further includes:
during each iteration of the calibration process, adding additional negative digital data segments to the calibration set.

46. The system of claim 44, wherein the calibration process further includes:
   prior to the first iteration of the calibration, compiling a set of additional negative digital data segments, adding the set of additional negative digital data segments to the calibration set to form an extended calibration set, and using the extended calibration set for all iterations of the calibration.

47. The system of claim 46, wherein the calibration process further includes:
   assigning a weight to each of the additional negative digital data segments.

48. The system of claim 33, wherein the digital data segment is an image.

* * * * *

UNITED STATES PATENT AND TRADEMARK OFFICE
CERTIFICATE OF CORRECTION

PATENT NO.        : 7,634,142 B1
APPLICATION NO.   : 11/042942
DATED             : December 15, 2009
INVENTOR(S)       : Bourdev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

Signed and Sealed this

Ninth Day of November, 2010

David J. Kappos
*Director of the United States Patent and Trademark Office*